(12) United States Patent
O'Toole

(10) Patent No.: US 10,855,103 B2
(45) Date of Patent: Dec. 1, 2020

(54) METHODS AND SYSTEMS FOR BACKUP POWER MANAGEMENT AT A POWER DEVICE

(71) Applicant: SCHNEIDER ELECTRIC IT CORPORATION, Andover, MA (US)

(72) Inventor: Peter J. O'Toole, Galway (IE)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 10 days.

(21) Appl. No.: 15/728,646

(22) Filed: Oct. 10, 2017

(65) Prior Publication Data

US 2019/0109487 A1 Apr. 11, 2019

(51) Int. Cl.

| | |
|---|---|
| *H02J 9/06* | (2006.01) |
| *H04W 24/04* | (2009.01) |
| *H04W 52/02* | (2009.01) |
| *H04L 12/931* | (2013.01) |
| *H04W 24/10* | (2009.01) |
| *H04L 12/24* | (2006.01) |
| *G06F 1/3212* | (2019.01) |
| *G06F 1/30* | (2006.01) |
| *G06F 1/3206* | (2019.01) |
| *H04L 12/26* | (2006.01) |
| *H04W 24/02* | (2009.01) |

(52) U.S. Cl.
CPC .............. *H02J 9/061* (2013.01); *G06F 1/30* (2013.01); *G06F 1/3206* (2013.01); *G06F 1/3212* (2013.01); *H04L 41/0659* (2013.01); *H04L 43/0817* (2013.01); *H04L 49/40* (2013.01); *H04W 24/04* (2013.01); *H04W 24/10* (2013.01); *H04W 52/0203* (2013.01); *H04L 41/145* (2013.01); *H04L 41/16* (2013.01); *H04L 43/028* (2013.01); *H04W 24/02* (2013.01)

(58) Field of Classification Search
CPC ........ H02J 9/061; H04L 49/40; H04L 43/028; H04W 52/0203; H04W 24/10; H04W 24/04
See application file for complete search history.

(56) References Cited

U.S. PATENT DOCUMENTS

| | | | |
|---|---|---|---|
| 6,064,857 A * | 5/2000 | Wiedeman | H04B 1/56 455/127.1 |
| 10,048,996 B1 * | 8/2018 | Bell | G06F 11/3452 |

(Continued)

FOREIGN PATENT DOCUMENTS

| | | |
|---|---|---|
| JP | H0621954 A | 1/1994 |
| KR | 101180164 B1 | 9/2012 |
| TW | 201908917 A | 3/2019 |

OTHER PUBLICATIONS

Extended European Search Report from corresponding European Application No. 18199534.1 dated Oct. 23, 2019.

*Primary Examiner* — Jared Fureman
*Assistant Examiner* — Emmanuel Dominique
(74) *Attorney, Agent, or Firm* — Lando & Anastasi, LLP

(57) ABSTRACT

Methods and systems are described for power state management. A critical usage window may be configured at a gateway node. A change in a power state of the gateway node may be detected, at an interface, during the critical usage window. The power state of the gateway node may be adjusted via the interface for a set duration using a backup power node.

20 Claims, 8 Drawing Sheets

(56) References Cited

U.S. PATENT DOCUMENTS

| | | |
|---|---|---|
| 2004/0075343 A1 | 4/2004 | Wareham et al. |
| 2005/0229016 A1 | 10/2005 | Addy |
| 2006/0028347 A1 | 2/2006 | Ziejewski et al. |
| 2007/0002771 A1* | 1/2007 | Berkman ............... H04B 3/542 370/257 |
| 2007/0135971 A1 | 6/2007 | Andarawis et al. |
| 2009/0013210 A1* | 1/2009 | McIntosh ............ H04L 41/0672 714/4.1 |
| 2009/0193268 A1 | 7/2009 | Kreiner et al. |
| 2010/0001586 A1 | 1/2010 | Bernard et al. |
| 2010/0016034 A1 | 1/2010 | Lindqvist et al. |
| 2010/0185882 A1 | 7/2010 | Arnold et al. |
| 2010/0235490 A1* | 9/2010 | Nasnas ................... H04L 43/04 709/224 |
| 2010/0238003 A1* | 9/2010 | Chan ...................... G01D 4/004 340/538 |
| 2013/0173939 A1 | 7/2013 | Peto |
| 2013/0304268 A1* | 11/2013 | Pernia ....................... G06F 1/26 700/286 |
| 2014/0082393 A1* | 3/2014 | Liang ................... G06F 1/3212 713/323 |
| 2014/0370843 A1* | 12/2014 | Cama ................... H04W 24/08 455/405 |
| 2014/0380072 A1 | 12/2014 | Lee |
| 2015/0067377 A1 | 3/2015 | Park et al. |
| 2016/0294197 A1 | 10/2016 | Thompson et al. |
| 2017/0093625 A1* | 3/2017 | Pera ....................... H04W 88/12 |
| 2019/0033938 A1 | 1/2019 | Ou Yang et al. |
| 2019/0107877 A1* | 4/2019 | O'Toole ................... G06F 1/28 |

\* cited by examiner

METHODS AND SYSTEMS FOR BACKUP POWER MANAGEMENT AT A POWER DEVICE

TECHNICAL FIELD

The present disclosure is generally directed to backup power management. More particularly, aspects of the present disclosure relate to methods and systems for backup power management at, for example, an uninterruptible power supply (UPS) during blackout or brownout conditions.

INTRODUCTION

The use of power devices or nodes, such as an UPS, to provide regulated, uninterrupted power for sensitive and/or critical loads (e.g., computer systems and/or other data processing systems) when an input power source such as a utility mains fails, is known. Many different UPS products are available, including those identified under the trade name SMART-UPS from APC by Schneider Electric, Inc. of West Kingston, R.I. Most UPS' use batteries (or other power sources such as electronic circuitry, diesel generators or flywheels, etc.) to provide backup power to critical loads during blackout or brownout conditions (e.g., a critical window). But, because the runtime capacity of an UPS battery is finite and varies tremendously (e.g., due to changes in temperature, battery age, loading, etc.), in some instances, the runtime capacity of the UPS battery may expire during the critical window, suspending backup power to critical loads. Thus, it may be desirable to use, for example, wired and/or wireless technologies and/or computing (coupled with different internet protocols) to enable smart, backup power management at the UPS during these and other conditions.

SUMMARY

The present disclosure solves one or more of the above-mentioned problems and/or demonstrates one or more of the above-mentioned desirable features. Other features and/or advantages may become apparent from the description that follows.

In accordance with at least one exemplary embodiment, the present disclosure contemplates a method for power management at a power device or node (e.g., an UPS) that includes enabling a first mode of operation at an access point (e.g., a router and/or other gateway node) connected to the power node. The method may further include monitoring a power state of the power node at a user interface and isolating, at the user interface, network devices connected to the access point using a first parameter. When the monitored power state of the power node meets a first criteria, an end-user can disconnect, via the user interface, the isolated network devices for a set duration.

In accordance with at least another exemplary embodiment, the present disclosure contemplates a method for automatic power state management at an access point that includes configuring a critical usage window at the access point. The method may further include detecting, at an interface, a change in a power state of the access point during the critical usage window. After detecting the change, the power state of the access point can be adjusted for a set duration (e.g., a default time duration), at the interface, using a backup power device or node. The set duration correlates to network usage at variable time instants during the critical usage window.

In accordance with another exemplary embodiment, the present disclosure contemplates a method for reducing power expenditure at a power device or node that includes querying data associated with network devices (e.g., connected to the network at an access point) at set time intervals. The method may further include assigning numerical gradients or tags to the network devices based on the queried data and detecting a change in the power state of the access point. When one or more numerical gradients or tags assigned to the network devices meets a criteria, the power node can adjust, at an interface, the power state of the access point.

In accordance with at least another exemplary embodiment, the present disclosure contemplates a network system including an access point and a power device or node. The power device or node collects network data associated with network devices at set intervals, determines a power state of the access point, and provides backup power to the access point when the power state meets a first criteria and the network data meets a second criteria.

In accordance with another exemplary embodiment, the present disclosure contemplates a network system including a user interface in communication with an access point and a power device or node. The power device or node may be configured to: request a network usage status for network devices connected to the access point; classify the network devices based on the network usage status; and, when a change in a power state of the access point is detected, instruct the access point, at the user interface, to suspend power to network devices classified as non-critical for a set duration.

In accordance with at least another exemplary embodiment, the present disclosure contemplates a network system including an access point, a power device or node connected to the access point, and a user interface. The user interface may be configured to query a network usage status at the access point, detect a change in a power state of the access point, and, based on the queried network usage status, instruct the power node to provide backup power to the access point.

Additional objects and advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the invention, as disclosed or claimed. The claims should be entitled to their full breadth of scope, including equivalents.

BRIEF DESCRIPTION OF THE DRAWINGS

The present disclosure can be understood from the following detailed description either alone or together with the accompanying drawings. The drawings are included to provide a further understanding of the present disclosure, and are incorporated in and constitute a part of this specification. The drawings, which are incorporated in and constitute a part of this specification, illustrate one or more embodiments of the present disclosure and, together with the description, explain certain principles and operation. In the drawings.

DETAILED DESCRIPTION

This description and the accompanying drawings illustrate exemplary embodiments and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitations of items in a list is not to the exclusion of other like items that can be substituted or added to the listed items.

In accordance with various exemplary embodiments, the present disclosure contemplates methods and systems for smart, power state management at a network node (e.g., an UPS, router, etc.). For example, during a critical window (e.g., during blackout or brownout conditions), a power state of the network node may be monitored at an interface. Various exemplary embodiments may isolate loads at the network node and/or assign numerical gradients or tags to the loads based on, for example, queried data. On detection of a change in power state of the network node, and depending on a current operating mode, the network node may suspend power to isolated and/or tagged loads. In various exemplary embodiments, the network node may provide (or enable) machine-learning that predicts loads at the network node during the critical window and preemptively suspends power to, for example, isolated and/or tagged loads for a set duration. This enables smart, power state management at the network node by conserving power for sensitive and/or critical loads during the critical window.

Figure 1A:
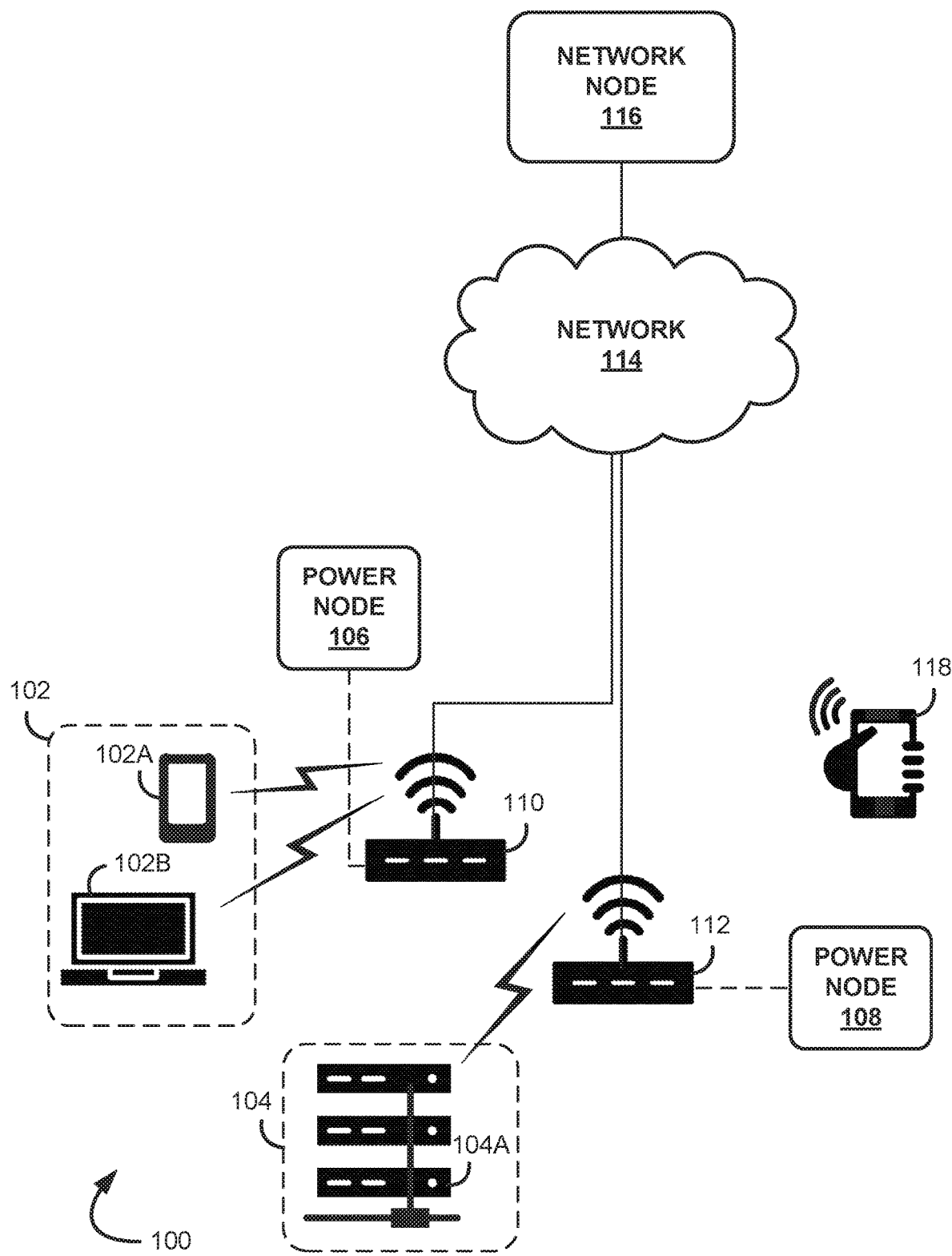
FIG. 1A is a schematic view of an exemplary network system configured to enable power state management at a network node in accordance with an exemplary embodiment of the present disclosure.

With reference now to FIG. 1A, a schematic view of an exemplary network system 100 is depicted. System 100 includes network devices 102A, 102B, 104A, 118 (e.g., a datacenter, remote terminal unit, cell phone, smart phone, computing platform, and/or other internet access device, etc.), which can use a local area network (LAN), wide area network (WAN), or internetwork (including the Internet) 102, 104 to communicate over communication network 114. System 100 further includes power nodes 106, 108, access points 110, 112, communication network 114, and network node 116. It is noted that the system components in FIG. 1A are not shown in any particular positioning and can be arranged as desired.

System 100 enables smart, power state management at power nodes 106, 108 by monitoring, at a processing node and/or other cloud-based or external control module configured to communicate with system 100, a power state (e.g., utility mains available, utility mains unavailable, utility mains unreliable, on, off, idle, active, etc.) of an input power source (e.g., utility mains), power nodes 106, 108, and/or access points 110, 112 and, when appropriate (e.g., after a predetermined wait time period), suspending power to, for example, isolated and/or tagged network loads (e.g., network devices 102A, 102B, 104A, 118, power nodes 106, 108, and/or access points 110, 112) for a set duration (e.g., milliseconds, seconds, minutes, hours, days, etc.).

Communication network 114 can be a wired and/or wireless network that uses, for example, physical and/or wireless data links to carry network data among (or between), for example, network devices 102A, 102B, 104A, 118, power nodes 106, 108, access points 110, 112, and/or network node 116. Network 114 can support voice, push-to-talk (PTT), broadcast video, and/or network data communications by network devices 102A, 102B, 104A, 118, power nodes 106, 108, access points 110, 112, and/or network node 116. Wireless network protocols can include, for example, MBMS, CDMA, 1×RTT, GSM, UMTS, HSPA, EV-DO, EV-DO rev. A, 3GPP LTE, WiMAX, etc. Wired network protocols can include, for example, Ethernet, Fast Ethernet, Gigabit Ethernet, Local Talk (such as Carrier Sense Multiple Access with collision Avoidance), Token Ring, FDDI, ATM, etc.

Network node 116 can also use, for example, physical and/or wireless data links to carry network data among (or between), for example, network devices 102A, 102B, 104A, 118, power nodes 106, 108, access points 110, 112, and/or network node 116. Network node 116 can be a standalone computing device, computing system, or network component. For example, network node 116 may include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc.

Figure 1B:
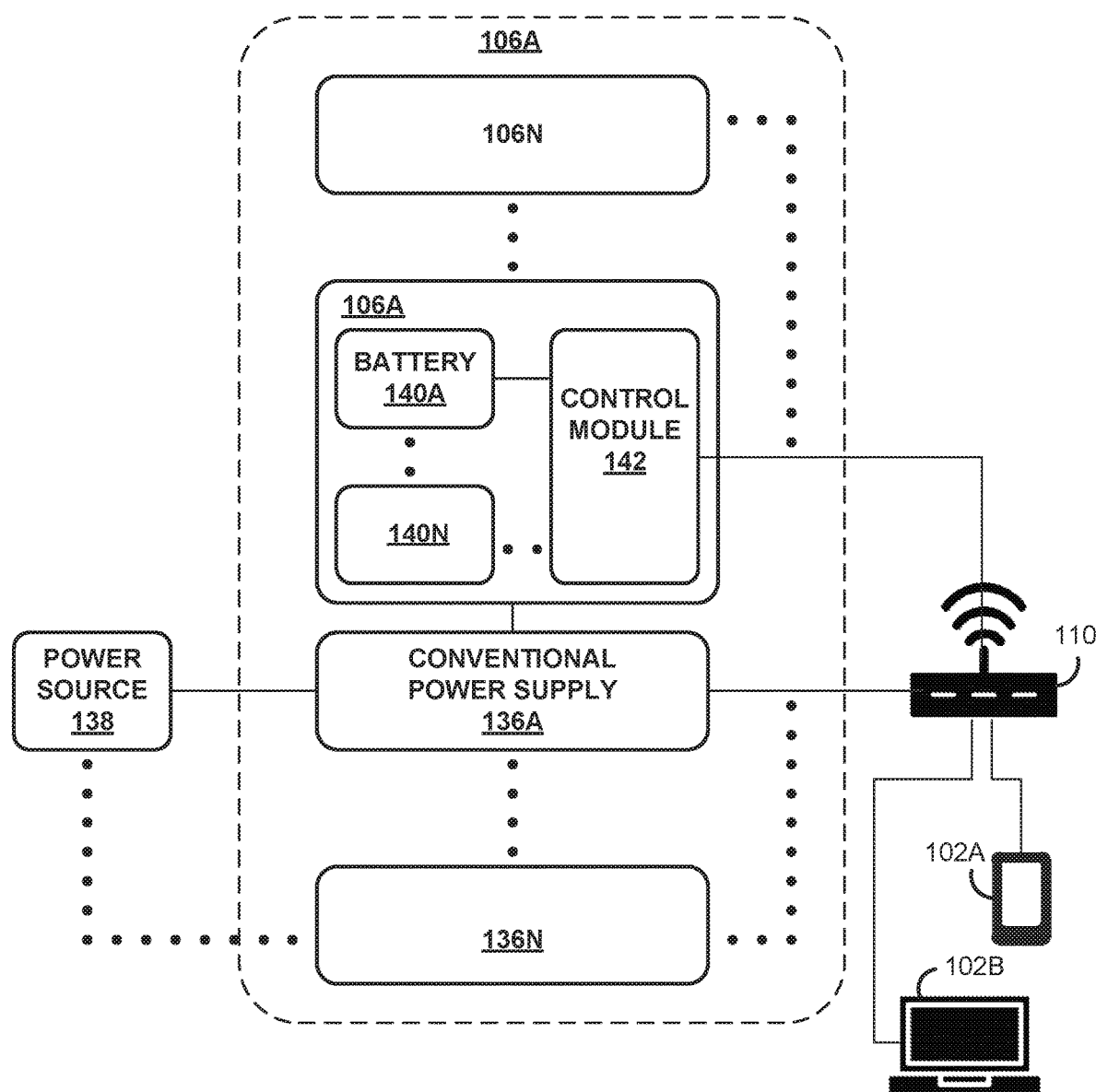
FIG. 1B is a schematic diagram that shows a portion of the exemplary network system of FIG. 1A in accordance with an exemplary embodiment of the present disclosure.

With reference now to FIG. 1B, a schematic view that shows a portion of the exemplary network system 100 is depicted. As noted above, system 100 is used to enable smart, power state management at, for example, power nodes 106, 108. In one exemplary embodiment, power node 106 can include UPS modules 106A-106N and/or conventional power supply modules 136A-136N. The UPS modules 106A-106N can be coupled (electrically or otherwise) to conventional power supply modules 136A-136N. Further, UPS modules 106A-106N and/or conventional power supply modules 136A-136N can be coupled to access point 110, which may be configured as a router and/or other gateway node. As shown in FIG. 1B, conventional power supply modules 136A-136N can be coupled to an input power source 138 (e.g., an external, alternating-current (AC) power source) at, for example, an input port or interface. AC voltage received at input power source 138 can be converted into a direct-current (DC) voltage at the conventional power supply modules 136A-136N to provide power to access point 110 and, when necessary, to provide charging energy to battery modules 140A-140N (or other power sources such as electronic circuitry, diesel generators or flywheels, etc.) of UPS modules 106A-106N.

As noted above, UPS modules 106A-106N can be coupled to conventional power supply modules 136A-136N. UPS modules 106A-106N include battery modules 140A-140N, which can include rechargeable type batteries such as lead-acid and/or lithium-ion batteries, etc., and control module 142. Control module 142 contains electrical and/or electronic circuits, which may be used to control functions of the battery modules 140A-140N of UPS modules' 106A-106N. For example, control module 142 can use the electrical and/or electronic circuits and integrated circuit components to detect a change in and/or a current power state (e.g., utility mains available, utility mains unavailable, utility mains unreliable, on, off, idle, or active, etc.) of, for example, UPS modules 106A-106N, conventional power supply modules 136A-136N, and/or access point 110. Based on the change in and/or current power state, control module 142 can choose to control functions of UPS modules 106A-106N such as, for example, charging battery modules 140A-140N, discharging battery modules 140A-140N, switching-off (or shutting-down) battery modules 140A-140N, and/or causing battery modules 140A-140N to enter an idle (or standby) mode.

Control module 142 can receive signals from input power source 138, conventional power supply modules 136A-136N, and/or access point 110. Control module 142 can use the signals to detect loss of input power source 138, conventional power supply modules 136A-136N, and/or access point 110. When loss of input power source 138, conventional power supply modules 136A-136N, and/or access point 110 is detected, control module 142 can engage and/or control one or more functions of UPS modules 106A-106N. For example, in one embodiment, control module 142 can engage a discharging function of battery modules 140A-140N to provide regulated, uninterrupted power to access point 110. Further, control module 142 can regulate voltage level(s) used to charge battery modules 140A-140N and/or to discharge power to access point 110. Multiple UPS modules 106A-106N, battery modules 140A-140N, and/or conventional power supply modules 136A-136N can be installed at power node 106 to increase charge capacity, power output capacity, and/or to provide hardware redundancy.

With reference now to FIGS. 1A and 1B, as noted above, access points 110, 112 can be configured as wired and/or wireless routers and/or other gateway nodes. Access points 110, 112 can facilitate receipt, routing, and/or forwarding of network data. Access points 110, 112 (or other network nodes such as, for example, network devices 102A, 102B, 104A, 118, power nodes 106, 108, and/or network node 116) can query network data at set time intervals (e.g., milliseconds, seconds, minutes, hours, days, etc.). In one embodiment, access points 110, 112 can isolate the network data (e.g., by performing deep packet inspection of network protocols, network data traffic, etc., associated with, for example, network devices 102A, 102B, 104A, 118, power nodes 106, 108, and/or access points 110, 112), associate the isolated network data with, for example, network loads, and assign tags (e.g., low priority, medium priority, high priority, critical, non-critical, etc.) to the isolated network data and/or associated network loads based on the query. In another exemplary embodiment, using machine-learning, access points 110, 112 (or other network nodes such as, for example, network devices 102A, 102B, 104A, 118, power nodes 106, 108, network node 116, and/or at other external networks) can generate (or assign) numerical gradients for/to network devices 102A, 102B, 104A, 118, access points 110, 112, and/or power nodes 106, 108 using the assigned tags. Criticality of, for example, the numerical gradients can be calculated as a probability and, when the probability meets or exceeds a threshold probability, can trigger suspension of power to the network devices 102A, 102B, 104A, 118, access points 110, 112, and/or power nodes 106, 108.

On detection of a change in and/or a current power state of UPS modules 106A-106N, conventional power supply modules 136A-136N, and/or access point 110, 112 and, depending on a current operating mode (e.g., manual or automatic) and/or calculated probability that meets or exceeds the probability threshold, network devices 102A, 102B, 104A, 118, power nodes 106, 108, and/or access points 110, 112 can trigger suspension of power to the isolated and/or tagged network data and/or network loads for a set duration (e.g., milliseconds, seconds, minutes, hours, days, etc.).

Figure 7:
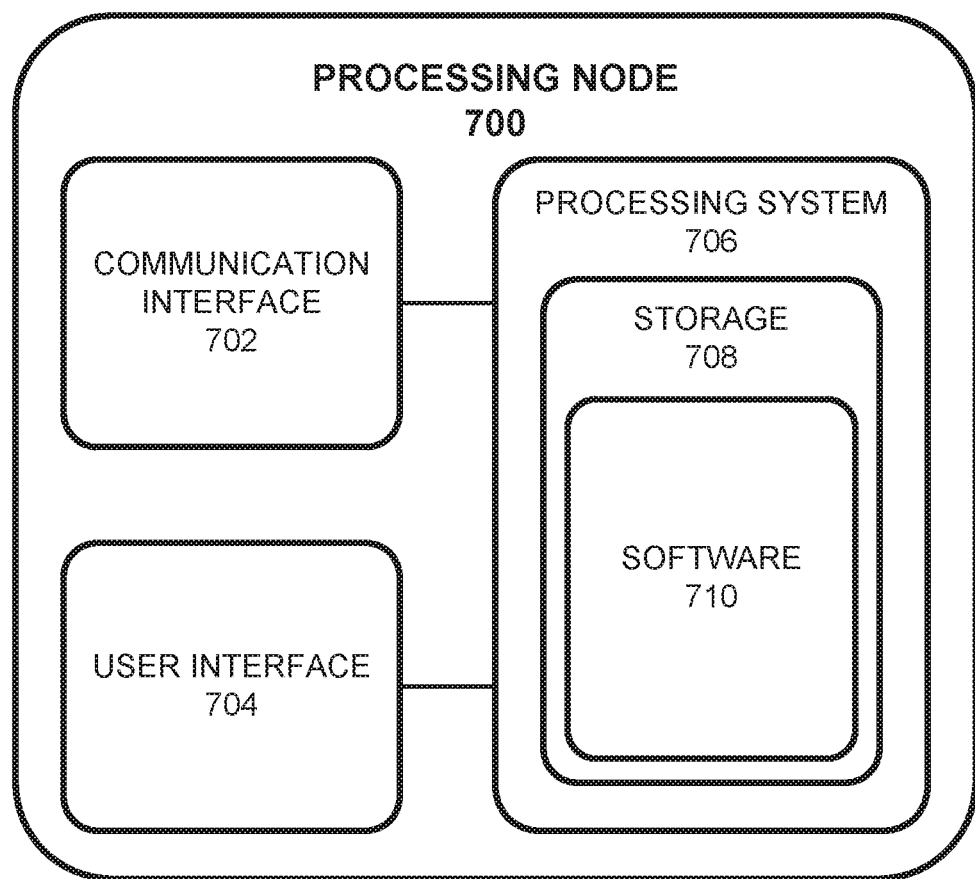
FIG. 7 is an exemplary processing node.

For example, in one embodiment, network devices 102A, 102B, 104A, 118, power nodes 106, 108 (e.g., including UPS modules 106A-106N, battery modules 140A-140N, control module 142, and/or conventional power supply modules 136A-136N), and/or access points 110, 112 can be in integrated with (e.g., at a control module) a communication interface 702, user interface 704, and/or processing system 706 (as shown in FIG. 7). The interfaces 702, 704 and/or processing system 706 can receive input signals that, for example, instruct adjustment, change, and/or control of a current power state of network devices 102A, 102B, 104A, 118, power nodes 106, 108 (e.g., including UPS modules 106A-106N, battery modules 140A-140N, control module 142, and/or conventional power supply modules 136A-136N), and/or access points 110, 112. The interfaces 702, 704 and/or processing system 706 can further generate control signals to adjust, change, and/or control the current power state of network devices 102A, 102B, 104A, 118, power nodes 106, 108 (e.g., including UPS modules 106A-106N, battery modules 140A-140N, control module 142, and/or conventional power supply modules 136A-136N), and/or access points 110, 112 and can generate output signals to provide haptic, tactile, and/or visual feedback of the adjusted, changed, and/or controlled power state to an end-user, network devices 102A, 102B, 104A, 118, power nodes 106, 108, and/or access points 110, 112. Using the interfaces 702, 704 and/or processing system 706, network devices 102A, 102B, 104A, 118, power nodes 106, 108, and/or access points 110, 112 can suspend power to the isolated and/or tagged network data and/or network loads using a switching-off (or shutting-down) function of and/or the idle (or standby) mode of battery modules 140A-140N and/or can instruct UPS modules 106A-106N and/or access points 110, 112 to "drop" the isolated and/or tagged network data and/or network loads.

Figure 2:
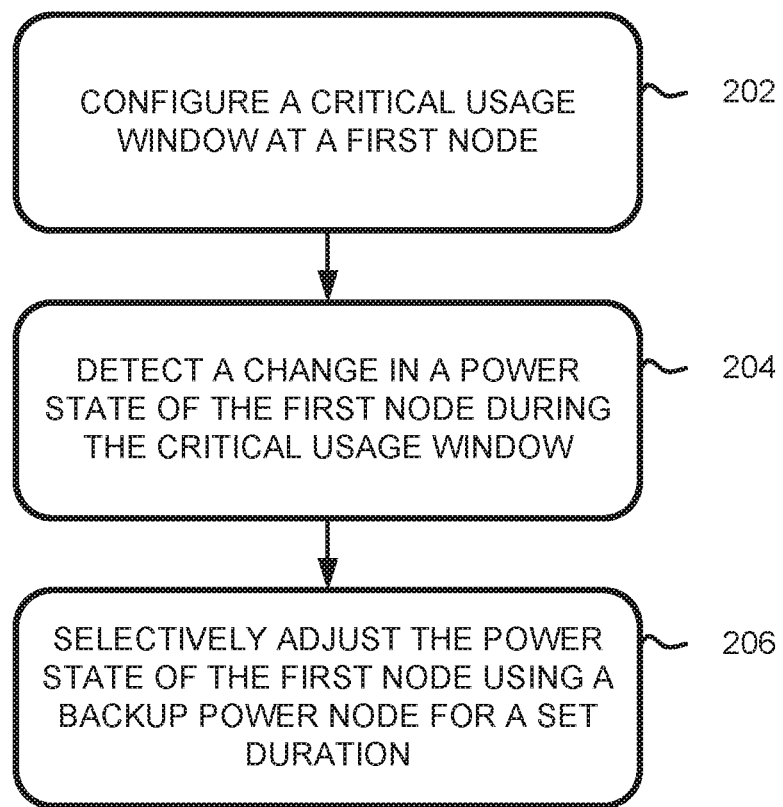
FIG. 2 is a flow diagram depicting a method for power state management at a network node in accordance with an exemplary embodiment of the present disclosure.

With reference now to FIG. 2, a flow diagram of an exemplary method for power state management at a network node is depicted. The method can be implemented in the exemplary network system 100 shown in FIGS. 1A and 1B, or with any suitable network system. The method for power state management shown in FIG. 2 is discussed with reference to the network system 100 shown in FIGS. 1A and 1B. In addition, while FIG. 2 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At step 202, a critical usage window may be configured at a first node. For example, a machine-learning mechanism can be enabled at network devices 102A, 102B, 104A, 118, power nodes 106, 108 (e.g., including UPS modules 106A-106N, battery modules 140A-140N, control module 142, and/or conventional power supply modules 136A-136N), access points 110, 112, and/or network node 116 and used to correlate network usage at variable time instants for each of network devices 102A, 102B, 104A, 118, power nodes 106, 108 (e.g., including UPS modules 106A-106N, battery modules 140A-140N, control module 142, and/or conventional power supply modules 136A-136N), and/or access points 110, 112. Using the correlations, the machine-learning mechanism can generate unique network usage models for each of network devices 102A, 102B, 104A, 118, power nodes 106, 108, and/or access points 110, 112 at set time intervals. In addition, the machine-learning mechanism can generate a basic heuristic (e.g. based on an aggregation of all of the unique network usage models) and, using the generated basic heuristic, can further generate a base network usage model (or pattern) for network devices 102A, 102B, 104A, 118, power nodes 106, 108, and/or access points 110, 112 such as, for example, a base network usage model that is "offline" from 1:00 a.m. until 5:00 a.m. The base network usage model can be updated for each of network devices 102A, 102B, 104A, 118, power nodes 106, 108, and/or access points 110, 112 using its generated unique network usage model. Critical usage windows can be dynamically configured for each network device 102A, 102B, 104A, 118, power node 106, 108, and/or access point 110, 112 using (or based on) its updated heuristic at, for example, network devices 102A, 102B, 104A, 118, power nodes 106, 108, access points 110, 112, and/or network node 116.

At step 204, network devices 102A, 102B, 104A, 118, power nodes 106, 108, access points 110, 112, and/or network node 116 can detect a change in and/or a current power state of, for example, power nodes 106, 108 (e.g., including UPS modules 106A-106N, battery modules 140A-140N, control module 142, and/or conventional power supply modules 136A-136N) and/or access points 110, 112. For example, power nodes 106, 108 can receive (or fail to receive) signals at an interface 702, 704 and/or processing system 706 from UPS modules 106A-106N, battery modules 140A-140N, control module 142, conventional power supply modules 136A-136N, and/or access points 110, 112 and use the signals (or lack thereof) to detect loss of: input power source 138, conventional power supply modules 136A-136N, and/or access points 110, 112. On detection of loss, power nodes 106, 108 and/or access points 110, 112 can engage and/or control functions of UPS modules 106A-106N. For example, power nodes 106, 108 and/or access points 110, 112 can engage a discharging function of battery modules 140A-140N to provide regulated, uninterrupted power to network devices 102A, 102B, 104A, 118, power nodes 106, 108, and/or access points 110, 112 operating in a configured critical usage window.

At step 206, network devices 102A, 102B, 104A, 118, power nodes 106, 108, access points 110, 112, and/or network node 116 can dynamically adjust, change, and/or control a current power state of power nodes 106, 108 (e.g., including UPS modules 106A-106N, battery modules 140A-140N, control module 142, and/or conventional power supply modules 136A-136N) and/or access points 110, 112 during a critical window. For example, if, at step 204, power nodes 106, 108 detect a loss of input power source 138, conventional power supply modules 136A-136N, and/or access point 110, 112, power nodes 106, 108 can send a notification to alert an end-user of the detected loss (e.g., via an interface 702, 704 and/or application such as, for example, a SmartConnect Personal Application, hosted at network device 118). The notification can include the critical usage window information for "on," "off," "idle," and/or "active" network devices 102A, 102B, 104A, 118 coupled to (or in communication with) power nodes 106, 108 and/or access points 110, 112. The end-user can change a current power state of power nodes 106, 108 (e.g., including UPS modules 106A-106N, battery modules 140A-140N, control module 142, and/or conventional power supply modules 136A-136N) and/or access points 110, 112 based on the critical usage window information reported for network devices 102A, 102B, 104A, 118. For example, if access points 110, 112 are supporting (or include) "on" or "active" network devices 102A, 102B operating during a configured critical usage window, the end-user (e.g., via an interface 702, 704 and/or application) can instruct power nodes 106, 108 to continue to engage the discharging function of battery modules 140A-140N to provide regulated, uninterrupted power to access points 110, 112 and supported network devices 102A, 102B, 104A for the duration of the configured critical usage window(s). Alternatively, if access points 110, 112 are supporting "off" or "idle" network devices 102A, 102B, 104A and/or "on" or "active" network devices 102A, 102B, 104A operating during a non-critical usage window, the end-user (e.g., via an interface 702, 704 and/or application) can instruct power nodes 106, 108 to suspend power to access points 110, 112 and supported network devices 102A, 102B, 104A using a switching-off (or shutting down) function of and/or idle (or standby) mode of battery modules 140A-140N and/or can instruct power nodes 106, 108 to "drop" access points 110, 112 and supported network devices 102A, 102B, 104A until one or more of access points 110, 112 and/or network devices 102A, 102B, 104A enter a configured critical usage window.

Figure 3:
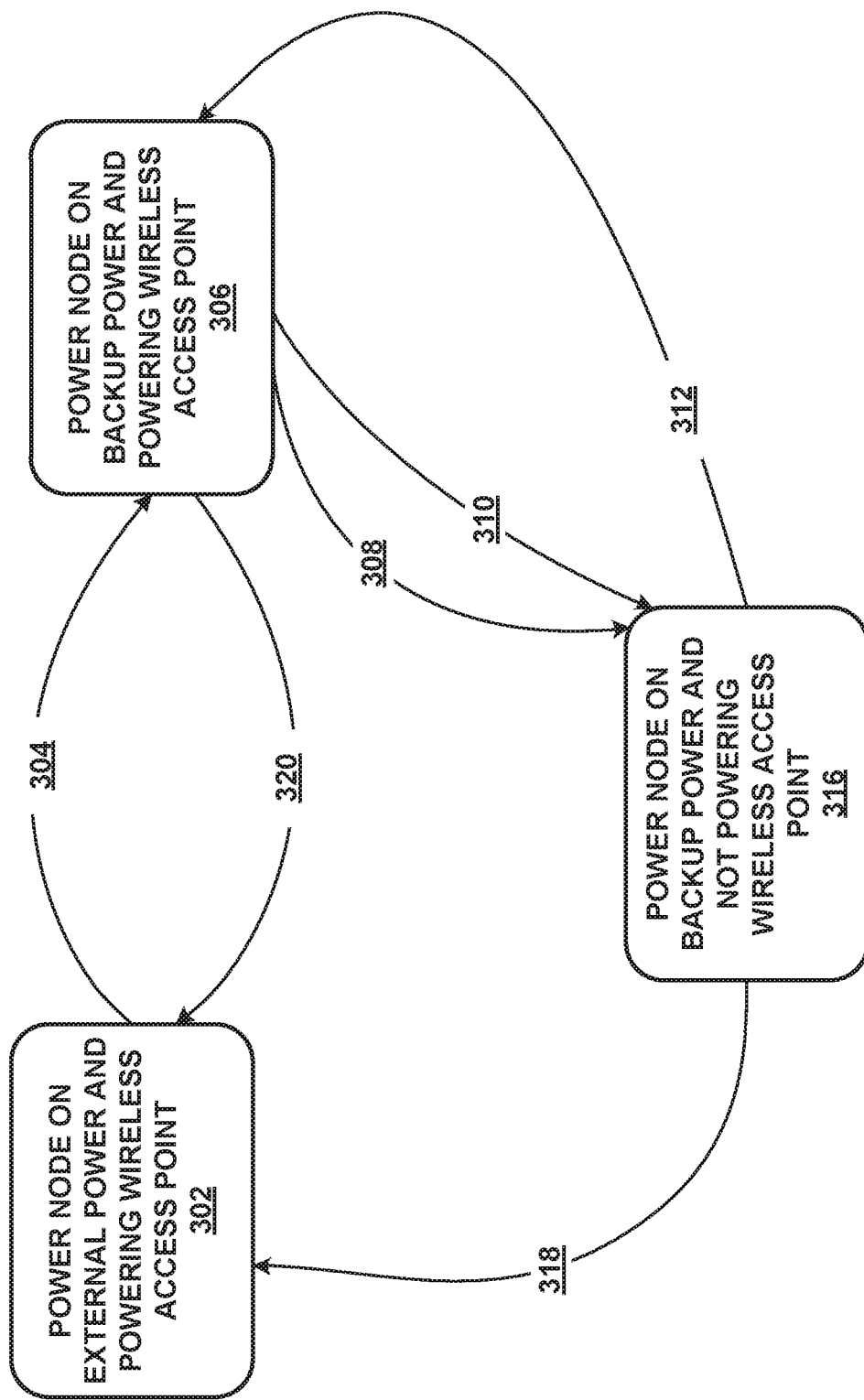
FIG. 3 is a schematic diagram that shows the exemplary network system of FIGS. 1A and 1B enabling a first mode of operation for power state management in accordance with an exemplary embodiment of the present disclosure.

With reference now to FIG. 3, a schematic diagram of a network system enabling a first mode of operation for power state management is depicted. The schematic diagram can be implemented in the exemplary network system 100 shown in FIGS. 1A and 1B, or with any suitable network system. The schematic diagram shown in FIG. 3 is discussed with reference to the network system 100 shown in FIGS. 1A and 1B. One skilled in the art, together with the description, will appreciate that various steps of the schematic diagram be omitted, rearranged, combined, and/or adapted in various ways.

At 302, a manual mode (i.e., a first mode) of operation is enabled at network devices 102A, 102B, 104A, 118, power nodes 106, 108, access points 110, 112, and/or network node 116. Power nodes 106, 108 can include conventional power supply modules 136A-136N and UPS modules 106A-106N. Conventional power supply modules 136A-136N can be coupled to an input power source 138 and provide charging energy to battery modules 140A-140N of UPS modules 106A-106N and/or access points 110, 112 during normal conditions (e.g., conditions other than a blackout or brown-out condition).

At 304, UPS modules 106A-106N and/or access points 110, 112 can detect a change in and/or a current power state of power nodes 106, 108 (e.g., including UPS modules 106A-106N, battery modules 140A-140N, control module 142, and/or conventional power supply modules 136A-136N) and/or access points 110, 112. For example, in one embodiment, UPS modules 106A-106N receive (or fail to receive) signals from conventional power supply modules 136A-136N and/or access points 110, 112. The UPS modules 106A-106N may use the signals (or lack thereof) to detect loss of: an input power source 138, conventional power supply modules 136A-136N, and/or of access points 110, 112. On detection of loss, power nodes 106, 108 and/or access points 110, 112 can engage and/or control functions of UPS modules 106A-106N. For example, power nodes 106, 108 can engage a discharging function of battery modules 140A-140N to provide regulated, uninterrupted power to network devices 102A, 102B, 014A, power nodes 106, 108, and/or access points 110, 112.

At 306-310, an end-user can be situated at a visitor location (e.g., a first location outside a range of power nodes 106, 108 and/or access points 110, 112). Power nodes 106, 108 (e.g., including UPS modules 106A-106N, battery modules 140A-140N, control module 142, and/or conventional power supply modules 136A-136N) and/or access points 110, 112 can send a notification to alert the end-user of the detected loss of power (step 304) (e.g., via an interface 702, 704 and/or application such as, for example, a SmartConnect Personal Application, hosted at network device 118). The notification can further inform the end-user of isolated and/or tagged network data and/or loads. For example, before, during, or after the detected loss of power, access points 110, 112 (or network nodes 102A, 102B, 104A, 118, power nodes 106, 108, and/or network node 116) can query network data of network loads at set time intervals. Access points 110, 112 (or network nodes 102A, 102B, 104A, 118, power nodes 106, 108, and/or network node 116) can isolate the network data, associate the isolated network data with network loads, and assign numerical gradients or tags to the isolated network data and/or network loads based on the query. For the isolated and/or tagged loads, the notification can include critical usage window information. The notification can further request that the end-user suspend power (e.g., via an interface 702, 704 and/or application) to access points 110, 112 and supported network devices 102A, 102B, 104A using the switching-off (or shutting down) function of and/or idle (or standby) mode of battery modules 140A-140N and/or can request that the end-user instruct power nodes 106, 108 to "drop" access points 110, 112 and/or instruct access points 110, 112 to "drop" supported network devices 102A, 102B, 104A operating outside its critical usage window and/or based on assigned tags. In some instances, network devices 102A, 102B, 104A may be supported directly at the power nodes 106, 108 and/or otherwise apart from access points 110, 112 using, for example, alternative power nodes, UPS modules, and/or internal battery modules configured at the network devices 102A, 102B, 104.

At 308, the end-user can dismiss (e.g., via an interface 702, 704 and/or application) the notification request. For example, if the notification indicates that the isolated and/or tagged network loads are "high-priority" and/or "critical" loads and/or that the network loads are operating during a configured critical usage window, the end-user can dismiss (e.g., via an interface 702, 704 and/or application) the notification request and continue to provide regulated, uninterrupted power to network devices 102A, 102B, 104A, power nodes 106, 108, and/or access points 110, 112 for the duration of the configured critical usage window. As the runtime capacity of the battery modules 140A-140N deplete, power nodes 106, 108 (e.g., including UPS modules 106A-106N, battery modules 140A-140N, control module 142, and/or conventional power supply modules 136A-136N) and/or access points 110, 112 can send update notifications (e.g., via an interface 702, 704 and/or application) that alert the end-user of a current status (e.g., a percentage of charge remaining) of battery modules 140A-140N. Alternatively, the end-user can configure, adjust, and/or specify default alert thresholds (e.g., at 95% of charge remaining, at 50% of charge remaining, at 25% of charge remaining, at 5% of charge remaining, etc.) for a current status of the battery modules 140A-140N. Steps 306 and 308 can repeat.

At 310, the end-user can accept (e.g., via an interface 702, 704 and/or application) the notification request. For example, if the notification indicates that the isolated and/or tagged network loads are "low-priority," "medium priority," and/or "non-critical" loads and/or that the network loads are "on," "off," "idle," or "active" network devices 102A, 102B, 104A, power nodes 106, 108, and/or access points 110, 112 operating during a non-critical usage window, the end-user can accept (e.g., via an interface 702, 704 and/or application) the notification request. Acceptance of the notification request suspends power to network devices 102A, 102B, 104A, power nodes 106, 108, and/or access points 110, 112 using a switching-off (or shutting down) function of and/or idle (or standby) mode of battery modules 140A-140N and/or "drops" supported network devices 102A, 102B, 104A operating outside its critical usage window and/or assigned "low priority," "medium priority," or "non-critical" tags. If network devices 102A, 102B, 104A, power nodes 106, 108, and/or access points 110, 112 operating in an idle (or standby) mode enter a critical usage window and/or the assigned tag is adjusted or changed to "high-priority" or "critical," an update notification can be sent (e.g., via an interface 702, 704 and/or application) to alert the end-user of the adjusted or changed status. Alternatively, acceptance of the notification request can include a set duration (e.g., milliseconds, seconds, minutes, hours, days, etc.) for suspension of power to network devices 102A, 102B, 104A, power nodes 106, 108, and/or access points 110, 112. After the set duration expires, a switching-on (or turning on) function of battery modules 140A-140N can be automatically enabled such that power is supplied to network devices 102A, 102B, 104A, power nodes 106, 108, and/or access points 110, 112. Steps 306 and 310 can repeat.

Steps 306-310 can be performed at a home location (e.g., a second location within a range of power nodes 106, 108 and/or access points 110, 112). If the end-user is situated at the home location, the notification request includes a warning that suspending power to network devices 102A, 102B, 104A, power nodes 106, 108, and/or access points 110, 112 will cause the end-user to lose a connection to communication network 116.

At 312, at the home location, the end-user can manually cause power nodes 106, 108 (e.g., including UPS modules 106A-106N, battery modules 140A-140N, control module 142, and/or conventional power supply modules 136A-136N) and/or access points 110, 112 to adjust, change, and/or control functions of UPS modules 106A-106N such as, for example, charging battery modules 140A-140N, discharging battery modules 140A-140N, switching-off (or shutting-down) battery modules 140A-140N, and/or causing battery modules 140A-140N to enter an idle (or standby) mode at, for example, interfaces 702, 704 of a control module associated with the same. In some instances, at step 316, power nodes 106, 108 and/or access points 110, 112 can engage a discharging function of battery modules 140A-140N such that power nodes 106, 108 self-charge (or power) even when the power nodes 106, 108 are not supporting network loads.

At 318 and 320, power nodes 106, 108 (e.g., including UPS modules 106A-106N, battery modules 140A-140N, control module 142, and/or conventional power supply modules 136A-136N) are coupled to input power source 138. When power nodes 106, 108 and/or access points 110, 112 detect a change and/or current power state of input power source 138 and/or conventional power supply modules 136A-136N from "off" or "idle" to "on" or "active," the power nodes can switch from using battery power (e.g., using battery modules 140A-140N) to using input power source 138 and/or conventional power supply modules 136A-136N. Conventional power supply modules 136A-136N can provide charging energy to battery modules 140A-140N of UPS modules 106A-106N.

Figure 4:
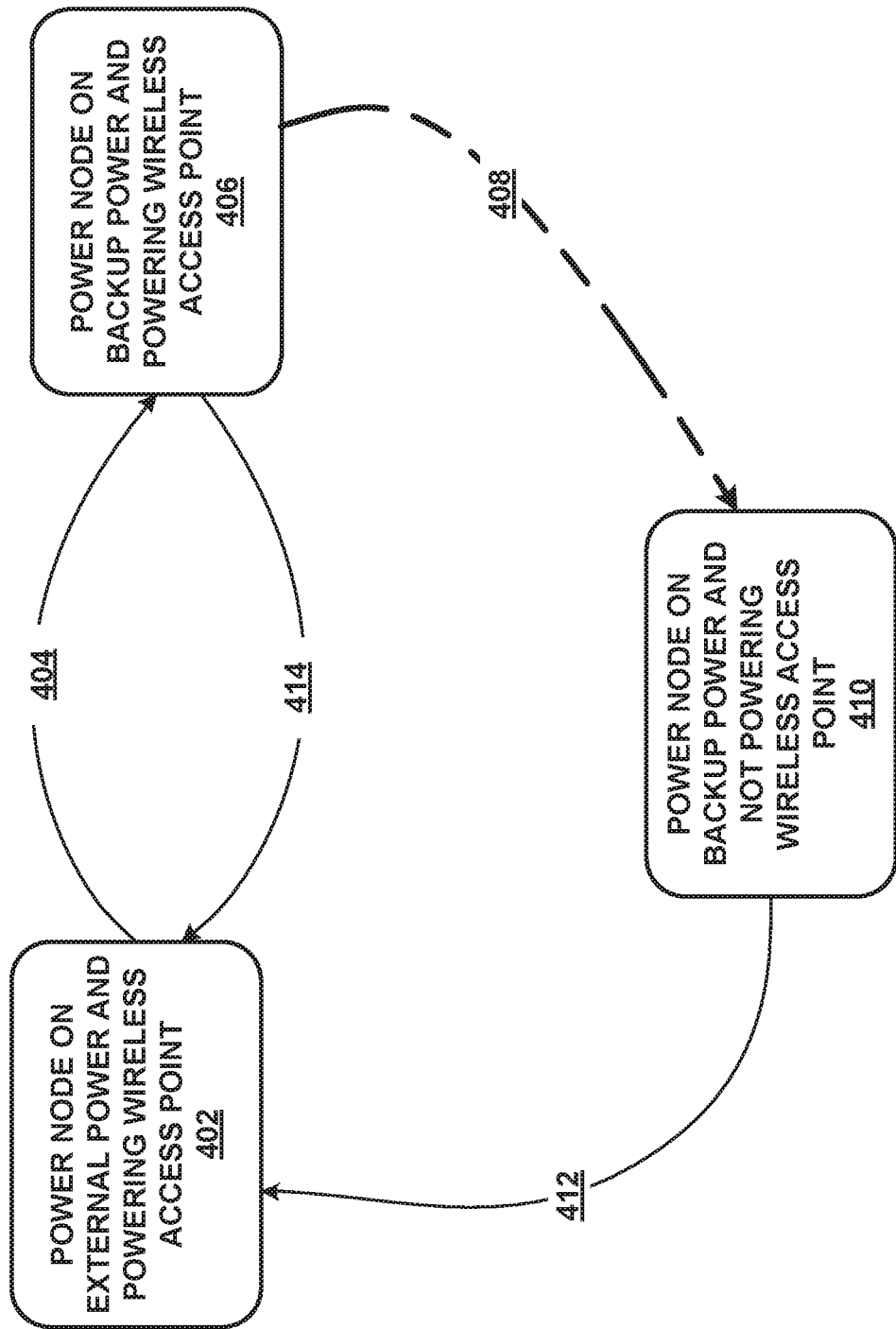
FIG. 4 is a schematic diagram that shows the exemplary network system of FIGS. 1A and 1B enabling a second mode of operation for power state management in accordance with an exemplary embodiment of the present disclosure.

With reference now to FIG. 4, a schematic diagram of a network system enabling a second mode of operation for power state management is depicted. The schematic diagram can be implemented in the exemplary network system 100 shown in FIGS. 1A and 1B, or with any suitable network system. The schematic diagram shown in FIG. 4 is discussed with reference to the network system 100 shown in FIGS. 1A and 1B One skilled in the art, together with the description, will appreciate that various steps of the schematic diagram be omitted, rearranged, combined, and/or adapted in various ways.

At 402, an automatic (i.e., a second mode) mode of operation is enabled at network devices 102A, 102B, 104A, 118, power nodes 106, 108, access points 110, 112, and/or network node 116. Power nodes 106, 108 can include conventional power supply modules 136A-136N and UPS modules 106A-106N. Conventional power supply modules 136A-136N can be coupled to an input power source 138 and provide charging energy to battery modules 140A-140N of UPS modules 106A-106N and/or access points 110, 112 during normal conditions.

At 404, UPS modules 106A-106N and/or access points 110, 112 can detect a change in and/or a current power state of power nodes 106, 108 (e.g., including UPS modules 106A-106N, battery modules 140A-140N, control module 142, and/or conventional power supply modules 136A-136N) and/or access points 110, 112. For example, in one embodiment, UPS modules 106A-106N receive (or fail to receive) signals from conventional power supply modules 136A-136N and/or access points 110, 112. The UPS modules 106A-106N may use the signals (or lack thereof) to detect loss of: an input power source 138, conventional power supply modules 136A-136N, and/or access points 110, 112. On detection of loss, power nodes 106, 108 and/or access points 110, 112 can engage and/or control functions of UPS modules 106A-106N. For example, power nodes 106, 108 and/or access points 110, 112 can engage a discharging function of battery modules 140A-140N to provide regulated, uninterrupted power to network devices 102A, 102B, 104A, 118, power nodes 106, 108, and/or access points 110, 112.

At 406, the discharging function of battery modules 140A-140N is engaged and an end-user is situated at a visitor location. In automatic mode, network devices 102A, 102B, 104A, 118, power nodes 106, 108, access points 110, 112, and/or network node 116 can dynamically adjust, change, and/or control a power state of power nodes 106, 108 (e.g., including UPS modules 106A-106N, battery modules 140A-140N, control module 142, and/or conventional power supply modules 136A-136N) and/or access points 110, 112 during a critical window.

In one exemplary embodiment, a machine-learning mechanism can be executed at processing node 700 and/or other cloud based or external control modules. The machine-learning mechanism can be used to correlate network usage at variable time instants for each of network devices 102A, 102B, 104A, power nodes 106, 108 (e.g., including UPS modules 106A-106N, battery modules 140A-140N, control module 142, and/or conventional power supply modules 136A-136N), and/or access points 110, 112. Using the correlations, the machine-learning mechanism can generate unique network usage models for each of network devices 102A, 102B, 104A, power nodes 106, 108, and/or access points 110, 112 at set time intervals. In addition, the machine-learning mechanism can generate a basic heuristic (e.g. based on an aggregation of all of the unique network usage models) and, using the generated basic heuristic, can further generate a base network usage model (or pattern) for network devices 102A, 102B, 104A, power nodes 106, 108, and/or access points 110, 112 such as, for example, a base network usage model that is "offline" from 1:00 a.m. until 5:00 a.m. The generated base network usage model can be updated for each of network devices 102A, 102B, 104A, power nodes 106, 108, and/or access points 110, 112 using its own unique network usage model. For example, based on its unique network usage model, network device 102A's base network usage model may be updated to indicate that network device 102A is "online" from 1:00 a.m. until 2:00 a.m. rather than "offline". Critical usage windows can be dynamically configured for each network device 102A, 102B, 104A, 118, power node 106, 108, and/or access point 110, 112 using (or based on) its updated heuristic.

At 408, power nodes 106, 108 (e.g., including UPS modules 106A-106N, battery modules 140A-140N, control module 142, and/or conventional power supply modules 136A-136N) and/or access points 110, 112 can send a notification to alert an end-user of the detected loss of power (steps 404 and 406) (e.g., via an interface 702, 704 and/or application such as, for example, a SmartConnect Personal Application, hosted at network device 118). Before, during, and/or after sending the notification, power nodes 106, 108 and/or access points 110, 112 can evaluate (e.g., using deep packet inspection of network protocols, network data traffic, etc., associated with, for example, network devices 102A, 102B, 104A, power nodes 106, 108, and/or access points 110, 112) critical usage window information for network devices 102A, 102B, 104A, power nodes 106, 108, and/or access points 110, 112. If, after the evaluation, power nodes 106, 108 and/or access points 110, 112 determine, for example, that access points 110, 112 are supporting (or include) "on" or "active" network devices 102A, 102B, 104A operating during a configured critical usage window, power nodes 106, 108 and/or access points 110, 112 (e.g., via an interface 702, 704 and/or application) can alert (e.g., by sending a notification) the end-user that power nodes 106, 108 (e.g., including UPS modules 106A-106N, battery modules 140A-140N, control module 142, and/or conventional power supply modules 136A-136N) and/or access points 110, 112 will continue to engage the discharging function of battery modules 140A-140N to provide regulated, uninterrupted power to access points 110, 112 and supported network devices 102A, 1028, 104A for the duration of the configured critical usage windows.

Alternatively, if, after the evaluation, power nodes 106, 108 and/or access points 110, 112 determine, for example, that access points 110, 112 are supporting (or include) "off" or "idle" network devices 102A, 1028, 104A and/or "on" or "active" network devices 102A, 1028, 104A operating during a non-critical usage window, power nodes 106, 108 and/or access points 110, 112 (e.g., via an interface 702, 704 and/or application) can alert (e.g., by sending a notification) the end-user that power nodes 106, 108 (e.g., including UPS modules 106A-106N, battery modules 140A-140N, control module 142, and/or conventional power supply modules 136A-136N) and/or access points 110, 112 will suspend power to access points 110, 112 and supported network devices 102A, 1028, 104A using a switching-off (or shutting down) function of and/or idle (or standby) mode of battery modules 140A-140N and/or will "drop" access points 110, 112 and supported network devices 102A, 1028, 104A operating outside a configured critical usage window until access points 110, 112 and/or network devices 102A, 1028, 104A enter a configured critical usage window. The notification request can include a set duration (e.g., milliseconds, seconds, minutes, hours, days, etc.) for suspension of power to network devices 102A, 1028, 104A, power nodes 106, 108, and/or access points 110, 112. After the set duration expires, a switching-on (or turning on) function of battery modules 140A-140N can be automatically enabled such that power is supplied to network devices 102A, 1028, 104A, power nodes 106, 108, and/or access points 110, 112. Alternatively, the end-user can override (e.g., via an interface 702, 704 and/or application) the automatic mode of operation and continue to provide regulated, uninterrupted power to network devices 102A, 1028, 104A, power nodes 106, 108, and/or access points 110, 112 regardless of the critical usage window information.

In one exemplary embodiment, power nodes 106, 108 and/or access points 110, 112 can operate in conjunction with a human-aided machine learning mechanism executed at process node 700 and/or other cloud-based or external control modules to predict network usage at variable time instants for each of network devices 102A, 1028, 104A, power nodes 106, 108, and/or access points 110, 112. For example, processing node 700 and/or other cloud-based or external control modules can collect network traffic data from network devices 102A, 1028, 104A, power nodes 106, 108, and/or access points 110, 112 at set time intervals (e.g., milliseconds, seconds, minutes, hours, days, etc.); the collected network traffic data can be sent to a rules engine hosted at (or that forms part of) the human-aided machine learning mechanism. The rules engine correlates the updated heuristics for each network device 102A, 102B, 104A, power node 106, 108, and/or access point 110, 112 with the collected information. Using the correlation, the rules engine predicts a current usage window and/or current power state for network devices 102A, 102B, 104A, power nodes 106, 108 (e.g., including UPS modules 106A-106N, battery modules 140A-140N, control module 142, and/or conventional power supply modules 136A-136N), and/or access points 110, 112. If the rules engine predicts, for example, that power nodes 106, 108 and/or access points 110, 112 are supporting (or include) "on" or "active" network devices 102A, 102B, 104A operating during a configured critical usage window, the power nodes 106, 108 and/or access points 110, 112 (e.g., via an interface 702, 704 and/or an application) can alert (e.g., by sending a notification) the end-user that the rules engine predicts that power nodes 106, 108 and/or access points 110, 112 are supporting "on" or "active" network devices 102A, 102B, 104A operating during a configured critical usage window and the power nodes 106, 108 and/or access points 110, 112 will continue to engage the discharging function of battery modules 140A-140N to provide regulated, uninterrupted power to access points 110, 112 and supported network devices 102A, 102B, 104A for the duration of the configured critical usage windows. The rule engine can attempt to find patterns associated with the critical windows and/or current power states of network device 102A, 102B, 104A, power node 106, 108, and/or access point 110, 112. In addition, the human-aided machine learning mechanism can enable machine learning such that correct and/or incorrect predictions (e.g., whether or not the end-user accepts and/or dismisses notifications to engage and/or disengage the discharging function of battery modules 140A-140N) can be tracked. The human-aided machine learning mechanism can assign weightings to predictions and update the weightings (e.g., assign an importance coefficient) based on whether or not the end-user accepts and/or dismisses an associated notification. In this manner, machine-learning can be used to predict and/or send more accurate notifications to the end-user.

Steps 406 and 408 can be performed at a home location. If the end-user is situated at the home location, the notification includes a warning that suspending power to and/or "dropping" power nodes 106, 108, access points 110, 112, and/or supported network devices 102A, 1028, 104A will cause the end-user to lose a connection to network 116.

At 410, at the home location, the end-user can dismiss the notification and/or manually instruct (e.g., via an interface 702, 704 and/or application) power nodes 106, 108 continue to provide regulated, uninterrupted power to network devices 102A, 1028, 104A, power nodes 106, 108, and/or access points 110, 112 regardless of critical usage window information. Further, power nodes 106, 108 and/or access points 110, 112 can automatically adjust, change, and/or control functions of UPS modules 106A-106N such as, for example, charging battery modules 140A-140N, discharging battery modules 140A-140N, switching-off (or shutting-down) battery modules 140A-140N, and/or causing battery modules 140A-140N to enter an idle (or standby) mode. In some instances, power nodes 106, 108 and/or access points 110, 112 can automatically engage a discharging function of battery modules 140A-140N such that power nodes 106, 108 and/or access points 110, 112 self-charge (or power) even when the power nodes 106, 108 and/or access points 110, 112 are not supporting network loads.

At 412 and 414, power nodes 106, 108 (e.g., including UPS modules 106A-106N, battery modules 140A-140N, control module 142, and/or conventional power supply modules 136A-136N) are coupled to input power source 138. When power nodes 106, 108 and/or access points 110, 112 detect a change and/or current power state of input power source 138 and/or conventional power supply modules 136A-136N from "off" or "idle" to "on" or "active," the power nodes can automatically switch from using battery power (e.g., using battery modules 140A-140N) to using input power source 138 and/or conventional power supply modules 136A-136N. Conventional power supply modules 136A-136N can provide charging energy to battery modules 140A-140N of UPS modules 106A-106N.

Figure 5:
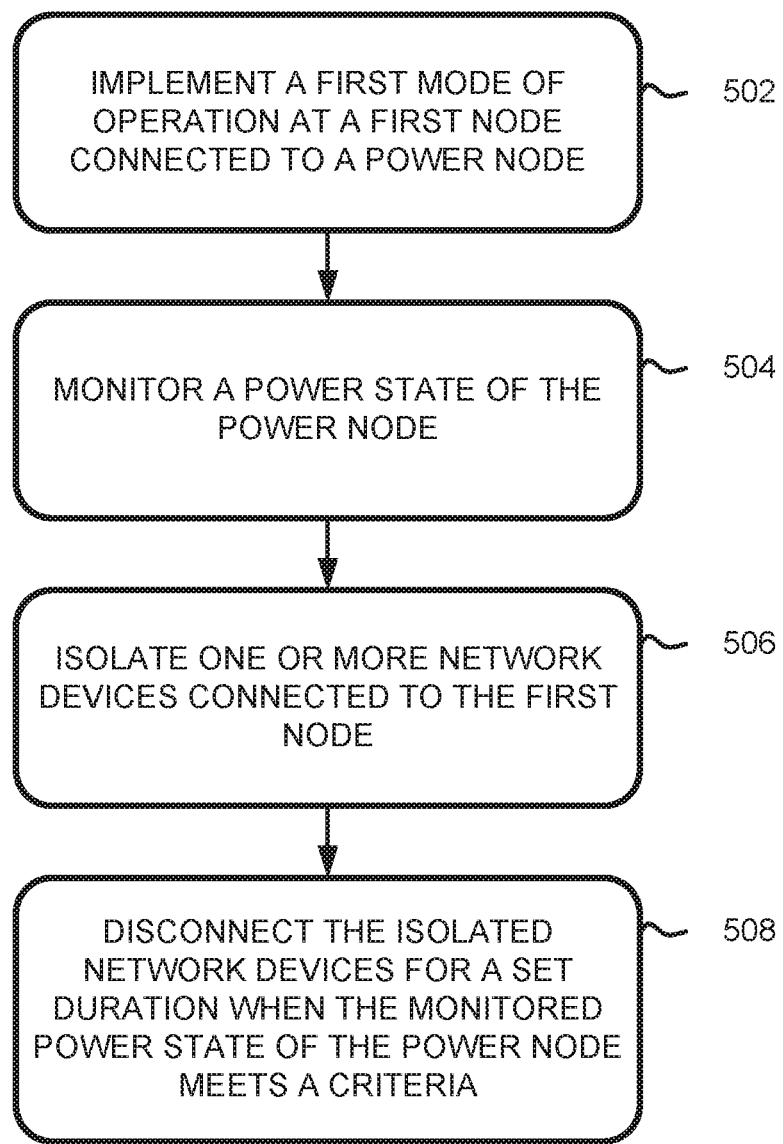
FIG. 5 is another flow diagram depicting a method for power state management at a network node in accordance with an exemplary embodiment of the present disclosure.

With reference now to FIG. 5, a flow diagram of an exemplary method for power state management at a network node is depicted. The method can be enabled in the exemplary network system 100 shown in FIGS. 1A and 1B, or with any suitable network system. The method for power state management shown in FIG. 5 is discussed with reference to the network system 100 shown in FIGS. 1A and 1B. In addition, while FIG. 5 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At steps 502 and 504, a first mode of operation may be enabled at a first node and a power state of a power node may be monitored. In one embodiment, a manual and/or automatic mode of operation can be enabled at network devices 102A, 102B, 104A, 118, power nodes 106, 108, access points 110, 112, and/or network node 116. UPS modules 106A-106N and/or access points 110, 112 can monitor a current power state of power nodes 106, 108 (e.g., including UPS modules 106A-106N, battery modules 140A-140N, control module 142, and/or conventional power supply modules 136A-136N) and/or access points 110, 112.

At step 506, one or more network devices connected to the first node can be isolated. Before, during, or after monitoring the power state of power nodes 106, 108 (e.g., including UPS modules 106A-106N, battery modules 140A-140N, control module 142, and/or conventional power supply modules 136A-136N) and/or access points 110, 112, access points 110, 112 (or other network nodes) can query network data of network loads at set time intervals. Access points 110, 112 (or other network nodes) can isolate network data of network loads that meet a set criteria.

At 508, UPS modules 106A-106N and/or access points 110, 112 can detect a change in the current power state of power nodes 106, 108 (e.g., including UPS modules 106A-106N, battery modules 140A-140N, control module 142, and/or conventional power supply modules 136A-136N) and/or access points 110, 112. For example, UPS modules 106A-106N can receive (or fail to receive) signals from conventional power supply modules 136A-136N and/or access points 110, 112. The UPS modules 106A-106N may use the signals (or lack thereof) to detect loss of: an input power source 138, conventional supply modules 136A-136N, and/or of access points 110, 112. On detection of loss, power nodes 106, 108 can engage a discharging function of battery modules 140A-140N to provide regulated, uninterrupted power to network devices 102A, 102B, 104A, power nodes 106, 108, and/or access points 110, 112. The end-user and/or the power nodes 106, 108 (e.g., via an interface 702, 704, application, or automatically) can suspend power to access points 110, 112 and supported network devices 102A, 102B, 104A whose isolated network data meets the set criteria using the switching-off (or shutting down) function of and/or idle (or standby) mode of battery modules 140A-140N and/or can instruct access points 110, 112 to "drop" supported network devices 102A, 102B, 104A whose isolated network data meets the set criteria.

Figure 6:
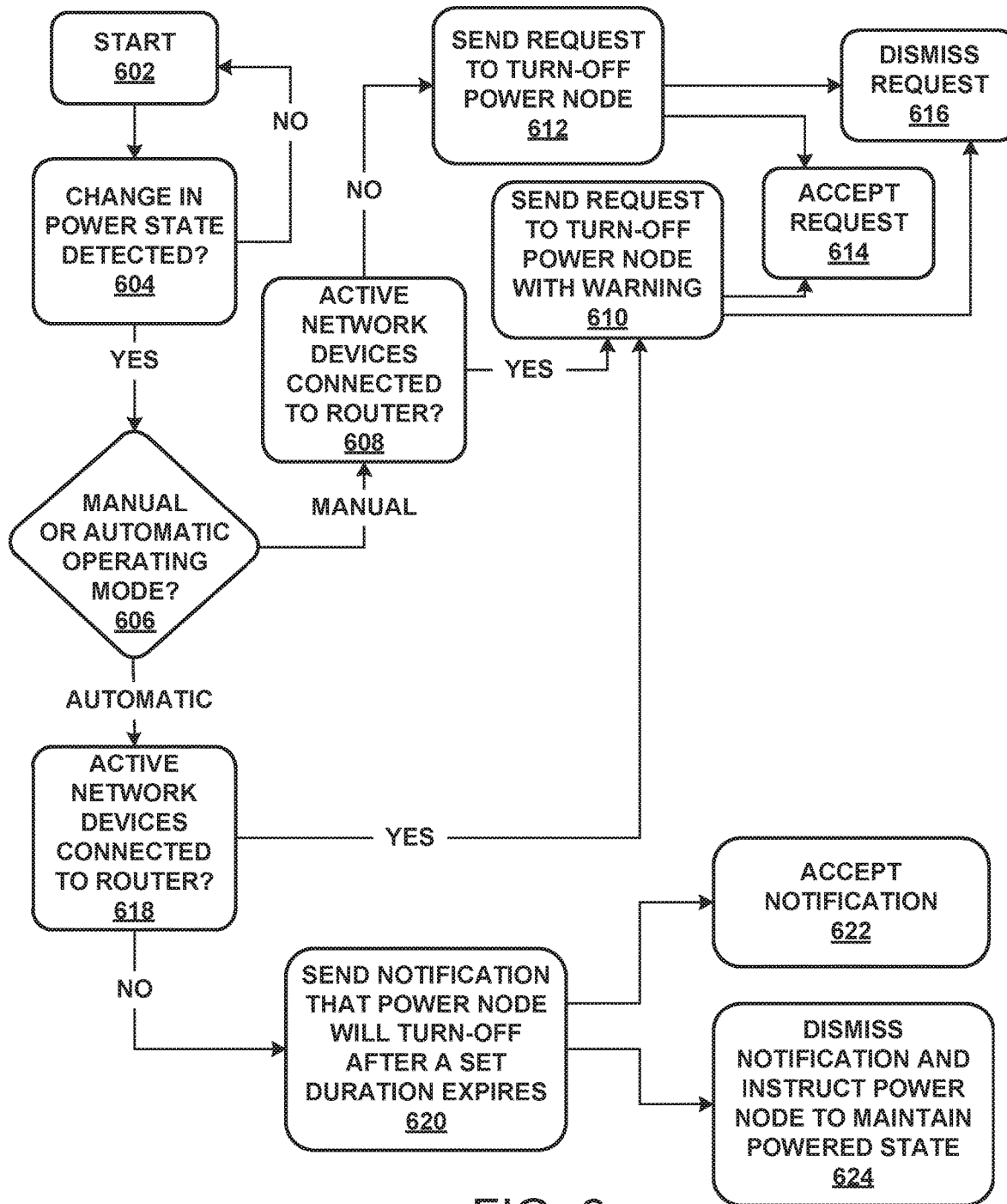
FIG. 6 is a flow chart diagram depicting methods for power state management at a network node in accordance with an exemplary embodiment of the present disclosure.

With reference now to FIG. 6, a flow chart diagram depicting methods for power state management is depicted. The schematic diagram can be enabled in the exemplary network system 100 shown in FIGS. 1A and 1B, or with any suitable network system. The flow chart diagram shown in FIG. 6 is discussed with reference to the network system 100 shown in FIGS. 1A and 1B One skilled in the art, together with the description, will appreciate that various steps of the schematic diagram be omitted, rearranged, combined, and/or adapted in various ways.

At step 602, power nodes 106, 108 (e.g., including UPS modules 106A-106N, battery modules 140A-140N, control module 142, and/or conventional power supply modules 136A-136N) and/or access points 110, 112 monitor a power state of power nodes 106, 108 and/or access points 110, 112. Step 602 repeats until, at step 604, UPS modules 106A-106N and/or access points 110, 112 detect a change in the power state of power nodes 106, 108 and/or access points 110, 112. For example, UPS modules 106A-106N receive (or fail to receive) signals from conventional power supply modules 136A-136N and/or access points 110, 112. The UPS modules 106A-106N may use the signals (or lack thereof) to detect loss of: an input power source 138, conventional power supply modules 136A-136N, and/or of access points 110, 112. On detection of loss, power nodes 106, 108 can engage a discharging function of battery modules 140A-140N to provide regulated, uninterrupted power to network devices 102A, 1028, 014A, power nodes 106, 108, and/or access points 110, 112.

At step 606, an operating mode of power nodes 106, 108 and/or access points 110, 112 is determined. For example, a manual and/or automatic operating mode of power nodes 106, 108 and/or access points 110, 112 can be configured at a processing node 700 and/or other cloud-based or external control module. In addition, an end-user can configure and/or adjust, at an interface 702, 704, the operating mode of power nodes 106, 108 and/or access points 110, 112. Processing node 700, other cloud-based or external control modules, power nodes 106, 108, and/or access points 110, 112 can report the updated operating mode to the end-user.

If, at step 606, the operating mode is a manual operating mode, then, at step 608, power nodes 106, 108 and/or access points 110, 112 collect network usage information from, for example, access points 110, 112 and/or supported network devices 102A, 102B, 104A. The network usage information can indicate that access points 110, 112 and/or supported network devices 102A, 1026, 104A are "on," "off," "idle," or "active." If, at step 608, access points 110, 112 and/or supported network devices 102A, 102B, 104A are "on" or "active," then, at step 610, power nodes 106, 108 and/or access points 110, 112 send a notification (e.g., via an interface 702, 704 and/or application such as, for example, a SmartConnect Personal Application, hosted at network device 118) requesting that an end-user suspend power to access points 110, 112 and supported network devices 102A, 102B, 104A using the switching-off (or shutting down) function of and/or idle (or standby) mode of battery modules 140A-140N and/or requests that the end-user instruct access points 110, 112 to "drop" supported network devices 102A, 102B, 104A. When the access points 110, 112 and/or supported network devices 102A, 102B, 104A are "on" or "active," then the notification includes a warning that suspending power to access points 110, 112 and/or supported network devices 102A, 102B, 104A will cause the access points 110, 112 to lose a connection to communication network 116. If, however, at step 608, access points 110, 112 and/or supported network devices 102A, 102B, 104A are "off" or "idle," then, at step 612, power nodes 106, 108 and/or access points 110, 112 send a notification (e.g., via an interface 702, 704 and/or application) requesting that an end-user suspend power to access points 110, 112 and supported network devices 102A, 102B, 104A using the switching-off (or shutting down) function of and/or idle (or standby) mode of battery modules 140A-140N. Because access points 110, 112 and/or supported network devices 102A, 102B, 104A are "off" or "idle," the notification does not include a warning. At step 614, the end-user can accept the request or, at step 616, the end-user can dismiss the request.

If, at step 606, the operating mode is an automatic operating mode, then, at step 618, power nodes 106, 108 and/or access points 110, 112 collect network usage information from, for example, access points 110, 112 and/or supported network devices 102A, 102B, 104A. The network usage information can indicate that access points 110, 112 and/or supported network devices 102A, 102B, 104A are "on," "off," "idle," or "active." If, at step 618, access points 110, 112 and/or supported network devices 102A, 102B, 104A are "on" or "active," then, at step 610, power nodes 106, 108 and/or access points 110, 112 send a notification (e.g., via an interface 702, 704 and/or application) requesting that an end-user suspend power to access points 110, 112 and supported network devices 102A, 102B, 104A using the switching-off (or shutting down) function of and/or idle (or standby) mode of battery modules 140A-140N and/or requests that the end-user instruct access points 110, 112 to "drop" supported network devices 102A, 102B, 104A. When the access points 110, 112 and/or supported network devices 102A, 102B, 104A are "on" or "active," then the notification includes a warning that suspending power to access points 110, 112 and/or supported network devices 102A, 102B, 104A will cause the access points 110, 112 to lose a connection to network 116. At step 614, the end-user can accept the request or, at step 616, the end-user can dismiss the request.

If, however, at step 618, access points 110, 112 and/or supported network devices 102A, 102B, 104A are "off" or "idle," then, at step 620, power nodes 106, 108 and/or access points 110, 112 send a notification (e.g., via an interface 702, 704 and/or application) alerting the end-user that power nodes 106, 108 and/or access points 110, 112 will automatically suspend power to access points 110, 112 and supported network devices 102A, 102B, 104A using a switching-off (or shutting down) function of and/or idle (or standby) mode of battery modules 140A-140N after a set duration expires. At step 622, the end-user can accept the notification. At step 624, the end-user can dismiss the notification and instruct power nodes 106, 108 and/or access points 110, 112 to maintain a powered state.

FIG. 7 illustrates an exemplary processing node 700 in a network system. Processing node 700 can include a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710, which is used in the operation of processing node 700. Storage 708 includes a disk drive, flash drive, data storage circuitry, or some other memory apparatus. Software 710 can include computer programs, firmware, or some other form of machine-readable instructions, including an operating system, utilities, drivers, network interfaces, applications, or some other type of software. Processing system 706 can include a microprocessor and other circuitry to retrieve and execute software 710 from storage 708. Processing node 700 can further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 can include network node 116, access points 110, 112, and/or power nodes 106, 108, UPS modules 106A-106N, battery module 140A-140N, control module 142, and/or conventional power supply modules 136A-136N. Processing node 700 can also be a component of a network element, such as a component of network node 116, access points 110, 112, and/or power nodes 106, 108, UPS modules 106A-106N, battery module 140A-140N, control module 142, and/or conventional power supply modules 136A-136N. Processing node 700 can also be another network element in a network system. Further, the functionality of processing node 700 can be distributed over multiple network elements of the network system.

The exemplary methods and systems described can be performed under the control of a processing system executing computer-readable codes embodied on a computer-readable recording medium or signals sent through a transitory medium. The computer-readable recording medium can be any data storage device that can store data readable by a processing system and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The signals transmitted through a transitory medium may include, for example, modulated signals transmitted through wired or wireless transmission paths.

The invention claimed is:

1. A method for power management at a power node, the method comprising:
    monitoring a current power state of a power node, the power node being connected to a gateway node and configured to operate in a first mode of operation;
    isolating, using a parameter, at least one network device connected to the gateway node, wherein isolating includes monitoring network data traffic for the at least one network device; and
    disconnecting the isolated at least one network device for a set duration when the current power state of the power node meets a criteria, wherein the set duration is based on the network data traffic.

2. The method of claim 1, wherein the gateway node is a wireless router configured to support the at least one network device.

3. The method of claim 2, further comprising:
    querying, at set time intervals, network data at the wireless router; and isolating, at the wireless router, the at least one network device using deep packet inspection.

4. The method of claim 1, wherein the parameter is an assigned tag.

5. The method of claim 4, wherein the assigned tag is at least one of: a low priority tag, medium priority tag, high priority tag, critical tag, and/or non-critical tag.

6. The method of claim 1, further comprising:
generating, using machine-learning, numerical gradients for the power node, gateway node, and/or at least one network device using the parameter; and
calculating a criticality for each of the generated numerical gradients; and when the calculated criticality exceeds a threshold probability,
disconnecting the isolated at least one network device.

7. The method of claim 1, wherein the current power state is at least one of: utility mains available, utility mains unavailable, and/or utility mains unreliable.

8. The method of claim 1, wherein the power node is an uninterruptible power supply (UPS).

9. The method of claim 1, wherein the first mode of operation is a manual mode of operation.

10. The method of claim 9, wherein a second mode of operation is an automatic mode of operation.

11. The method of claim 10, wherein the power node is configured to switch between the first mode of operation and the second mode of operation.

12. The method of claim 1, further comprising:
generating a unique network model for each of the network device and at least a second network device;
generating a heuristic based on an aggregation of the unique network models, the heuristic being used to generate a base network usage pattern for the network device and the second network device; and
updating, at set time intervals, the base network usage pattern for each of the network devices using the unique network model.

13. A method for automatic power state management of a gateway node, the method comprising:
configuring a critical usage window at the gateway node;
detecting, at an interface, a change in a power state of the gateway node during the critical usage window; and
adjusting, via the interface, the power state of the gateway node using a backup power node for a set duration, wherein the set duration is based on network usage at variable time instants during the critical usage window.

14. The method of claim 13, wherein the critical usage window is configured for each of a plurality of connected network devices:
correlating, using a machine-learning mechanism, network usage for the plurality of network devices at variable time instants;
generating unique network usage models for each of the plurality of network devices using the correlations;
generating a basic heuristic;
generating a base network usage pattern for each of the plurality of network devices based on the basic heuristic; and
updating the base network usage pattern for each of the plurality of network devices based on a respective unique network usage model.

15. The method of claim 14, wherein the basic heuristic is generated using an aggregation of the unique network usage models of each of the plurality of network devices.

16. The method of claim 13, wherein the gateway node is a router.

17. The method of claim 13, wherein the backup power node is an uninterruptible power supply (UPS).

18. A network system, comprising:
a router; and
an uninterruptible power supply (UPS) connected to the router, the UPS configured to:
collect network data associated with network devices from the router at set time intervals;
determine, based on the collected network data, a power state of the router; and
provide backup power to the router when the power state of the router meets a first criteria and the network data meets a second criteria.

19. The network system of claim 18, wherein the router is configured to communicate with a user interface and the UPS.

20. The network system of claim 19, wherein the UPS is further configured to:
request network usage statuses for network devices connected to the router;
classify the network devices based on the network usage status; and
instruct the router via the user interface to disconnect network devices classified as non-critical for a set duration when the power state meets the first criteria.

* * * * *